(12) United States Patent
Stubbs et al.

(10) Patent No.: US 12,068,773 B2
(45) Date of Patent: Aug. 20, 2024

(54) BACKPACKABLE ELECTRONIC WARFARE SYSTEM

(71) Applicant: Naval Information Warfare Center Pacific, San Diego, CA (US)

(72) Inventors: Andrew Lee Stubbs, Charleston, SC (US); Laura Catherine Tolliver, Charleston, SC (US); Kevin Paul Votapka, Charleston, SC (US); Wilmot S Gilland, IV, Goose Creek, SC (US); Tyler Austin Brant, Summerville, SC (US); Ian McLean Christine, Raleigh, NC (US); Hunter J Smith, Charleston, SC (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 349 days.

(21) Appl. No.: 17/825,356

(22) Filed: May 26, 2022

(65) Prior Publication Data

US 2023/0387956 A1   Nov. 30, 2023

(51) Int. Cl.
*H04B 1/3827* (2015.01)
*H04B 1/3883* (2015.01)

(52) U.S. Cl.
CPC ........... *H04B 1/385* (2013.01); *H04B 1/3883* (2013.01)

(58) Field of Classification Search
CPC .............................. H04B 1/385; H04B 1/3883
USPC ........................................................... 455/73
See application file for complete search history.

(56) References Cited

U.S. PATENT DOCUMENTS

| | | | |
|---|---|---|---|
| 10,261,931 B2 * | 4/2019 | Klaba | G06F 13/4282 |
| 11,988,751 B2 * | 5/2024 | Sapp | G01S 19/256 |
| 2004/0180653 A1 * | 9/2004 | Royalty | H04L 67/12 455/431 |

* cited by examiner

*Primary Examiner* — Eugene Yun
(74) *Attorney, Agent, or Firm* — Naval Information Warfare Center, Pacific; Kyle Eppele; Matthew D. Pangallo (57) ABSTRACT

A backpackable electronic warfare system includes a backplane, one or more radioheads, one or more systems on a chip, a single board computer, a position, navigation, and timing module, a power management device, a thermal management device, and one or more batteries.

20 Claims, 10 Drawing Sheets

BACKPACKABLE ELECTRONIC WARFARE SYSTEM

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor. Licensing and technical inquiries may be directed to the Office of Research and Technical Applications, Space and Naval Warfare Systems Center, Atlantic, Code 70F00, North Charleston, SC, 29419-9022; (843) 218-3495; ssc_lant_T2@navy.mil; reference Navy Case Number 210872.

BACKGROUND

A portable radio is any device that can be transported by an individual and is able to receive, decode, and transmit radio signals. There are different types of portable two-way radios that are used for communication. For military applications, a manpack radio has traditionally been used. The manpack radio is low size, weight, and power for the distributed execution and orchestration of radio frequencies (RF). In addition, the manpack radios are operable in contested and congested environments, which may be required depending on the application.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

The current state of fielded backpackable electronic warfare systems includes standardized configurations of essential system components where depot-level repairs are needed for updates and modifications. This architecture and sustainability model leads to a variety of deficiencies. For example, current backpackable electronic warfare systems are application specific and cannot be changed or modified in the field. In addition, existing systems are bulky, suffer from short battery life, and, in some examples, require multiple personnel for transportation, operation, or both. Repair or modification of current systems in the field is difficult or impossible. Furthermore, if repair, modification, or recharging is possible with a system, battery or component "hot-swapping" has limited support. For some systems, updates or upgrades are time consuming and expensive.

The backpackable electronic warfare system herein includes modular subsystems, such as a modular intermediate backplane or modular radioheads. This allows the system to be interoperable with different standards. In addition, the backpackable electronic warfare system herein includes a reconfigurable communications architecture. This allows the system to be reconfigurable before, during, and after any particular application. Hardware can be "hot-swapped" with application specific hardware when necessary. Even when hot swapping is not possible, the modular systems are mission driven; the system can be powered down and reconfigured in the field. Furthermore, the system is designed to be upgradable by replacing the intermediate backplane rather than the entire system when new technology becomes available. The backpackable electronic warfare system also has the ability to fit into a vehicle mount cradle point to charge the batteries in the field, thereby improving battery life and expanding system capabilities.

The backpackable electronic warfare system herein includes a backplane, one or more radioheads, one or more systems on a chip, a single board computer, a position, navigation, and timing module, a power management device, a thermal management device, and one or more batteries. The one or more radioheads are connected to a switching matrix via signal lines and have a RF front-end architecture with a radiohead field programmable gate array to identify radiohead capabilities of the one or more radioheads being used. The one or more systems on a chip are connected to the switching matrix via signal lines and a 3U OpenVPX form factor following the Sensor Open Systems Architecture standards. The single board computer includes a processor, RAM, a PCIe connector, a USB connection, storage, and an Ethernet connection. The position, navigation, and timing module has an output clocking capable of providing a frequency signal to the one or more systems on a chip ranging from about 10 MHz to about 250 MHz. The power management device increases or decreases power to each component, and is capable of powering off unused components to save energy. The thermal management device dissipates equal to or greater than 160 W of heat. The one or more batteries provide an electrical power equal to or greater than 300 W. The backplane connects the one or more radioheads, the one or more systems on a chip, the one or more batteries, and the thermal management device to the single board computer, the position, navigation, and timing module, and the power management device.

Figure 1:
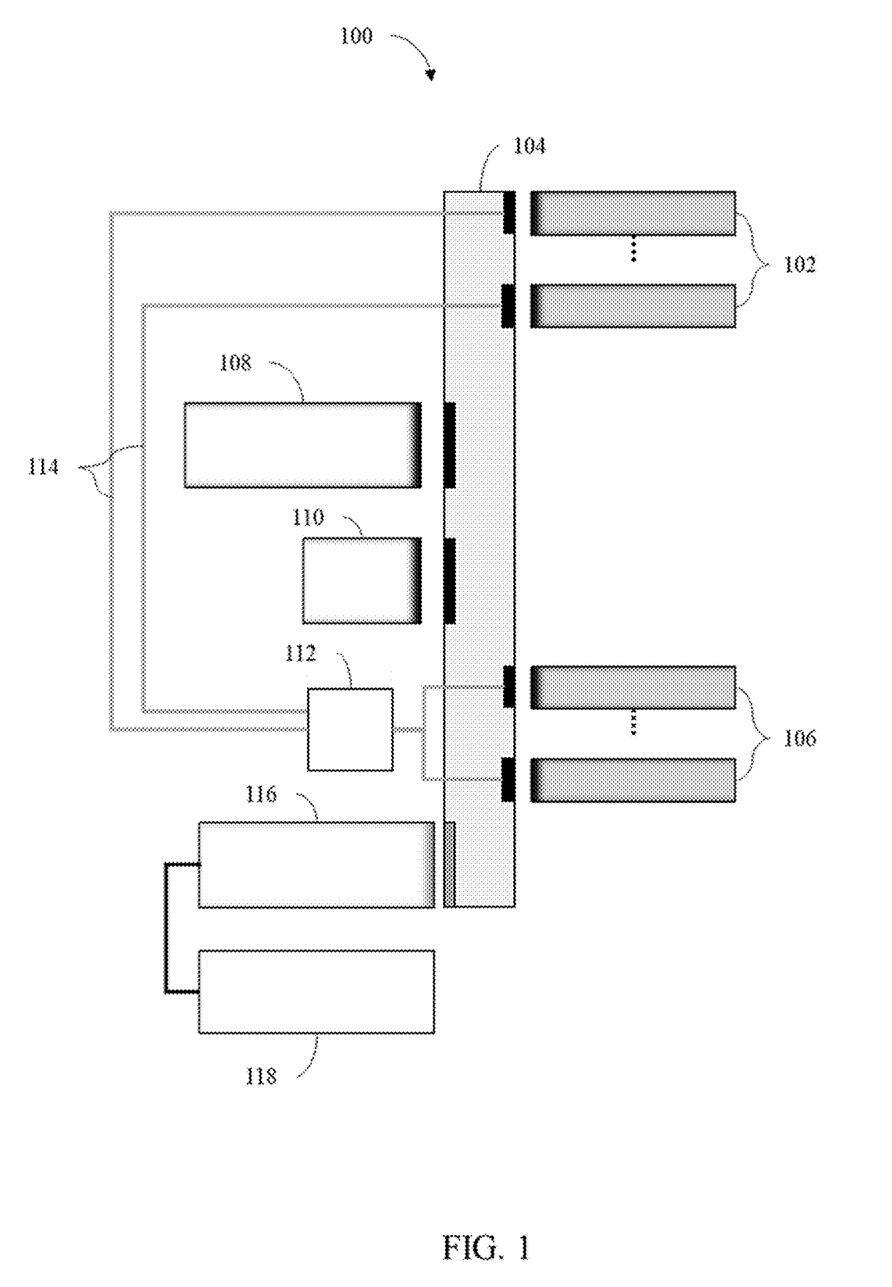
FIG. 1 is an example of a component overview of a backpackable electronic warfare system.

Referring now to FIG. 1, an example of the component overview of the backpackable electronic warfare system 100 is shown. The backplane 104 is shown in FIG. 1, which connects external components to internal components of the backpackable electronic warfare system 100. In an example, the external components include the one or more radioheads 102, the one or more systems on a chip 106, the one or more batteries 118, and the thermal management device. The internal components include the single board computer 108, the position, navigation, and timing module 110, and the power management device 116. The backplane 104 is capable of accommodating all types of communications (e.g., low voltage differential signal, PCIe, Ethernet, RF, optical, etc.). Additionally, the backplane 104 may assist with power management by conditioning the input voltage for the systems on a chip 106. The backpackable electronic warfare system 100 connects to an intermediate backplane 204 that allows external components to connect to the backplane 104. The intermediate backplane 204 is described in greater detail below.

In some examples, the backpackable electronic warfare system 100 herein may include one or more intermediate backplanes 204 that connect the one or more systems on a chip 106 to the backplane 104 via an intermediate backplane connector 202. The intermediate backplane connector 202 is modular and reconfigurable to function with the one or more systems on a chip 106. The intermediate backplane 204 also routes the pinouts from the brittle OpenVPX wafers and connectors 208 used in the one or more radioheads 102 discussed below and relays them to the more rugged intermediate backplane connectors 202. The intermediate backplane 204 allows cross-platform compatibility between any 3U OpenVPX system, such CMOSS and SOSA as well as incorporation of updated snapshots to fit in the legacy systems.

Figure 2A:
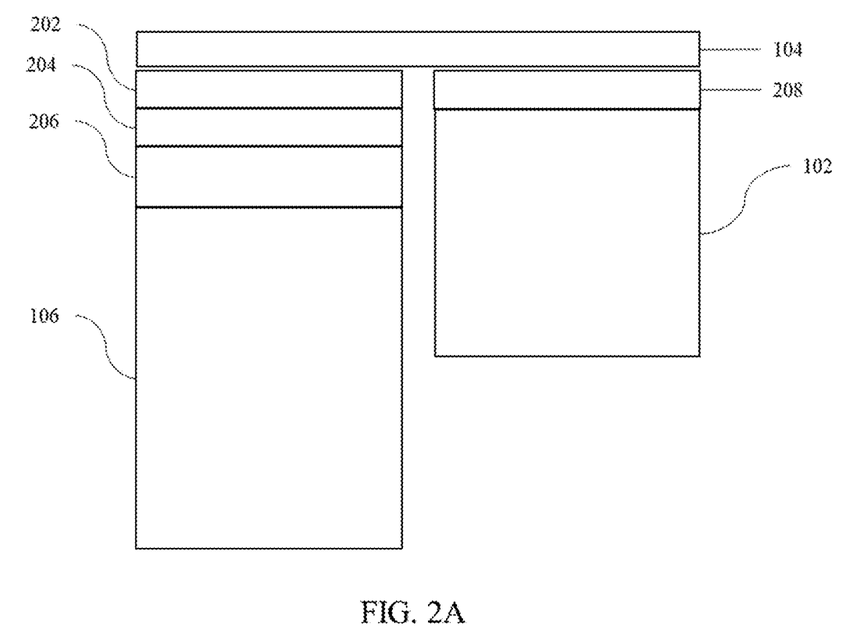
FIG. 2A-2B are examples of an intermediate backplane that would attach to the backpackable electronic warfare system.
Figure 2B:
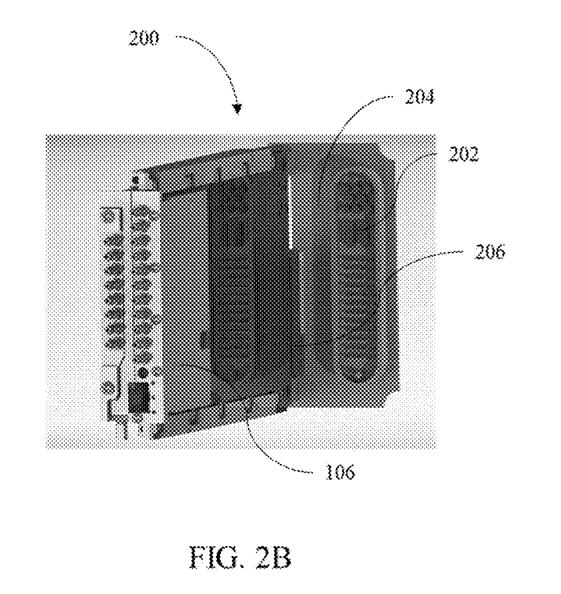

An example of a system 200 with an intermediate backplane 204 is shown in FIGS. 2A and 2B. In FIG. 2A, the one or more systems on a chip 106 is connected to a 3U OpenVPX connector 206, which connects to the intermediate backplane 204. The intermediate backplane 204 then connects to an intermediate backplane connector 202 that is directly connected to the backplane 104. A radiohead connector 208 may also be used to attach one or more radioheads 102 directly to the backplane 104 as well. This is discussed in greater detail herein when discussing the one or more radioheads 102.

FIG. 2B shows an isometric view of an example of the backpackable electronic warfare system 200 with an intermediate backplane 200. The system 200 includes an example of an intermediate backplane connector 202, an intermediate backplane 204, a 3U OpenVPX connector 206, and a system on a chip 106. In an example of a system with an intermediate backplane 200, each system on a chip 102 connected to the backpackable electronic warfare system 200 would include an intermediate backplane 204 that connects to the backplane 104 via an intermediate backplane connector 202. In other examples, one or more of the systems on a chip 106, but not all of the systems on a chip 106, are connected to the backpackable electronic warfare system 200 via an intermediate backplane 204 as shown in FIG. 2A and FIG. 2B.

The intermediate backplane connectors 202 are similar to the OpenVPX connectors 206 in form factor and transmit power, RF, and optical signals. Examples of intermediate backplane connector 202 functionality include modification of signal type (e.g., PCIe to UART) and voltage step up or step down (e.g., 3.3V to 5 V). The intermediate backplane connector 202 may be any connector that is rated for high mating cycles before failure, have alignment keys, does not require user interface to lock or unlock at the connection point, and supports SOSA or CMOS S standards of communication. In an example, the intermediate backplane connector 202 is any connector that can have equal to or greater than 1000 mating cycles before degradation. Some examples of the intermediate backplane connector 202 are the Tyco Electronics ARINC 600 or Smiths Interconnect L Series.

Referring back to FIG. 1, one or more radioheads 102 are included in the backpackable electronic warfare system 100. In one example, the one or more radioheads 102 are connected to a switching matrix 112 via signal lines 114. In addition, the one or more radioheads 102 can accommodate a RF front-end architecture with a radiohead field programmable gate array to identify radiohead capabilities of the one or more radioheads 102 being used. In the example in FIG. 1, only two radioheads 102 are shown, however one or more may be used. The radiohead field programmable gate array allows the system to perform capability discovery to identify the capabilities of the radiohead 102 that is connected via the backplane 104, such as center frequency, bandwidth, or output power, or any additional capabilities the radiohead field programmable gate array can identify.

In addition, the one or more radioheads 102 also include connectors 208 that connect a radiohead 102 to the backpackable electronic warfare system 100. Any connector may be used that is able to provide communications, keying, power, and RF at application specific frequencies while simultaneously preventing penetration of water and dust into the sealed hardware compartment with the backplane 104 and other components of the backpackable electronic warfare system 100. An example of the connector 208 includes a MIL-DTL-38999 connector, an ITT-Cannon MS27472 Series II connector, Meritec Hercules MIL-SPEC Connector, Smiths Interconnect L Series High Density Modular Connector, or a combination thereof.

Figure 3:
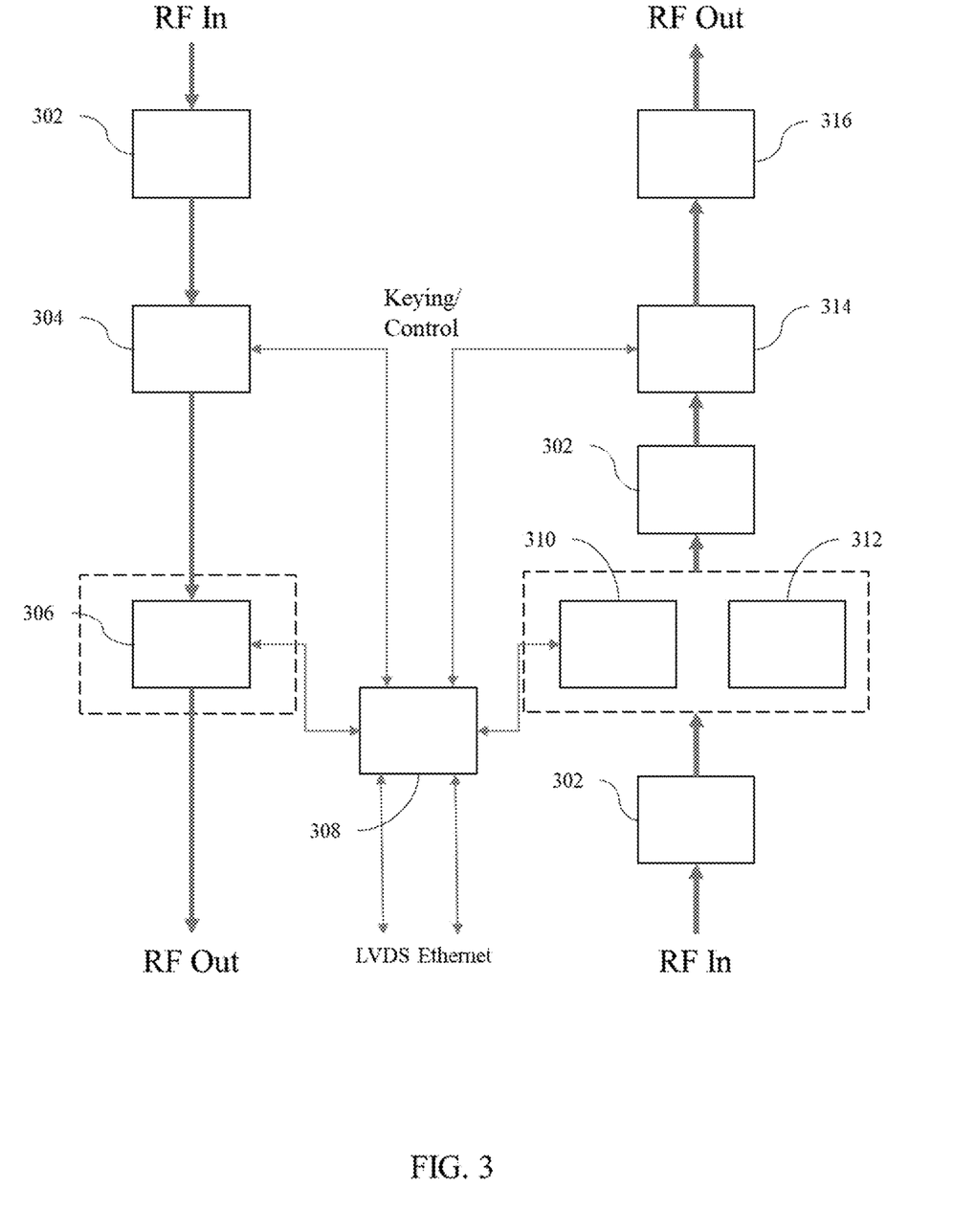
FIG. 3 is an example of a radiohead design used in the backpackable electronic warfare system.

An example of the design one or more radioheads 102 is shown in FIG. 3. In this example, the radiohead 102 includes three bandpass filters 302, low noise amplifier 304, down converter 306 (if necessary), up converter 310 or a preamplifier 312, a power amplifier 314, an attenuator 316, and a radiohead field programmable gate array 308. The radiohead field programmable gate array 308 is the same radiohead field programmable gate array previously described herein. The radiohead field programmable gate array 308 controls or keys the front end being used for the RF input or output signal. In addition, the radiohead field programmable gate array 308 also controls commands for the up converter 310, the down converter 306, or the preamplifier 312 if the up converter 310, down converter 306, or preamplifier 312 are components being used in the radiohead 102. In one example, the radiohead field programmable gate array 308 is also connected to the low voltage differential signal lines (LVDS) and Ethernet lines. When LVDS lines are used, the LVDS lines key the power amplifier 314 through the radiohead field programmable gate array 308. In another example, the signal lines may key the power amplifier 314. The Ethernet lines are connected to the single board computer 108 to provide keying or control instructions to the radiohead field programmable gate array 308. Any of the additional components shown in FIG. 3 can be selected based on specific frequencies depending on the application. However, none of the components is limited to a specific type of bandpass filters 302, low noise amplifier 304, down converter 306, up converter 310, preamplifier 312, a power amplifier 314, or an attenuator 316.

The one or more radioheads 102 also include a switching matrix 112. The switching matrix 112 act as relays, opening and closing a contactor to switch signal paths of the signal lines 114 on or off. Some examples of the switching matrix 112 include an RF switching matrix, when a RF system on a chip (RFSoC) is used or a fiber optic switch, when a multiprocessor system on a chip (MPSoC) is used. When an RF switching matrix is used, the signal lines 114 are RF lines. Additionally, any RF switches may be used in the RF switching matrix 112 that can switch RF paths on or off. Some examples of the RF switches include electromechanical switches, solid-state switches, micro electromechanical switches, or a combination thereof. When a fiber optic switch is used, the signal lines 114 are fiber optic lines. The fiber optic lines can be used as input to the fiber optic switch to route optical RF data to the one or more radioheads 102. In other examples, the fiber optic lines route directly to the one or more radioheads 102 or other MPSoCs and the fiber optic switch.

Figure 4:
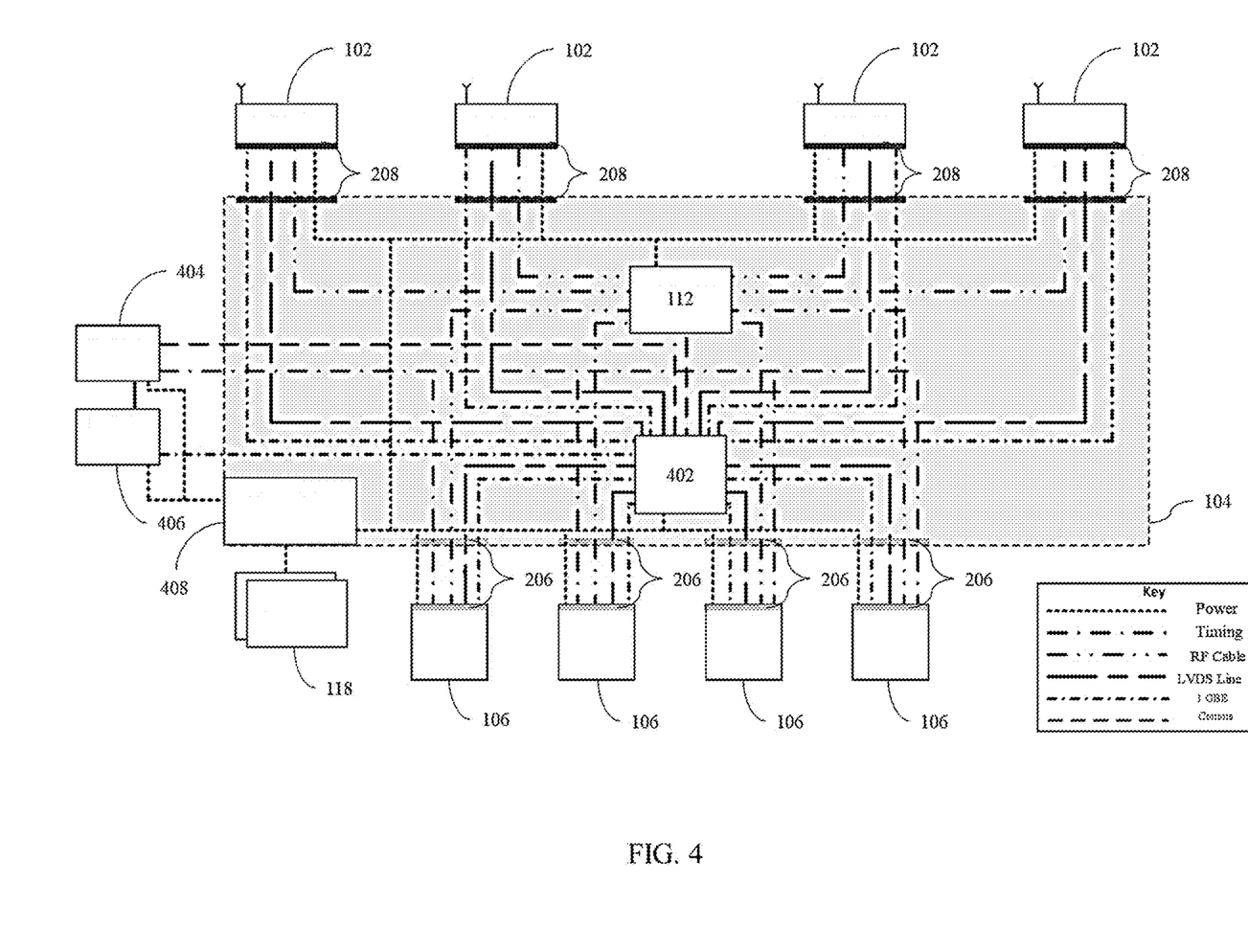
FIG. 4 is an example of a diagram of an RF switching matrix.

An example of a diagram showing an RF switching matrix 112 is shown in FIG. 4. In FIG. 4, the four radioheads 102 and four RF systems on a chip 106 are connected via connectors 208 and 206, respectively, through the backplane 104 to the RF switching matrix 112 and a combination of a low power field programmable gate array, 1 GbE control plane, and a low voltage differential signal switch 402. Each of the components in 402 are discussed in more detail herein. FIG. 4 also includes the GPS 404, external control plane or PCIe connections 406, and a power distribution device 408 that is connected to one or more batteries 118.

Referring back to FIG. 1, one or more systems on a chip 106 are included in the backpackable electronic warfare system 100. The one or more systems on a chip 106 are connected to the switching matrix 114 via signal lines 112 to perform signal ingestion, processing, and signal generation. The systems on a chip 106 have a 3U OpenVPX form factor following the Sensor Open Systems Architecture (SOSA) standards. Some examples of the one or more systems on a chip 106 include an RF system on a chip (RFSoC) or a multiprocessor system on a chip (MPSoC). Some specific examples of the systems on a chip 106 include PENTEK 5950, PENTEK 5550, Abaco VP430, and combinations thereof.

Figure 5:
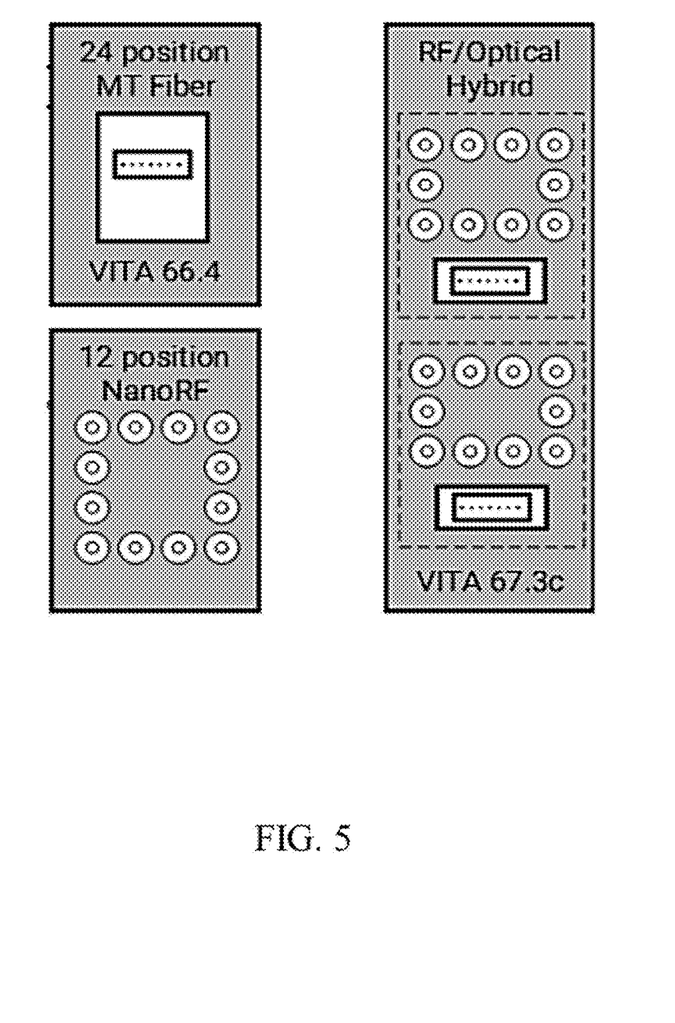
FIG. 5 is three examples of potential P2 connectors used in the backpackable electronic warfare system.

In addition, the systems on a chip 106 that have 3U OpenVPX form factor may include P2 port as shown in FIG. 5. FIG. 5 includes two examples of a P2 port where a choice between a 12-position nanoRF copper connector and a 24 position MT Optical ferrule, or a dual RF/Optical hybrid. The dual RF/Optical hybrid connector is equipped with a 10-position nanoRF and a four lane, bidirectional 100 GbE optical ferrule for a total of 20 nanoRF lines and 2×100 GbE optical capability per payload.

In one example, when the one or more RF systems on a chip are used, the RF systems on a chip also include a RF system on a chip field programmable gate array. The RF system on a chip field programmable gate array includes built in analog-to-digital converters (ADCs) and digital-to-analog converters (DACs) to generate and record RF data. In addition, the RF system on a chip field programmable gate array has one or more digital signal processing (DSP) slices and logic cores to allow for ingestion, generation, filtering, and processing of data. Some examples of the RF system on a chip field programmable gate array include XCZU27DR, XCZU47DR, and combinations thereof.

In another example, when the one or more systems on a chip 106 is one or more multiprocessor systems on chip (MPSoCs), the specific MPSoC will provide the system with embedded multiprocessing as well as the programmable logic of the field programmable gate array discussed in the previous example. The MPSoC may include multi-application processors, GPUs, or video codec capabilities, depending on the specific MPSoC chosen. The one or more MPSoCs will ingest data from the one or more radioheads and provide onboard RF signal processing. In some examples, RF data may be transferred to other embedded processors or MPSoCs over fiber optic signal cabling for additional or parallel processing. The processors of the MPSoCs may also include additional functions, such as parallel processing with function optimization, deep-learning processing with scalable AI/ML engines, and enhanced media encoding or decoding capabilities. Some examples of MPSoCs may include the ZU7EV, ZU11EG, ZU19EG, and combinations thereof.

Figure 6:
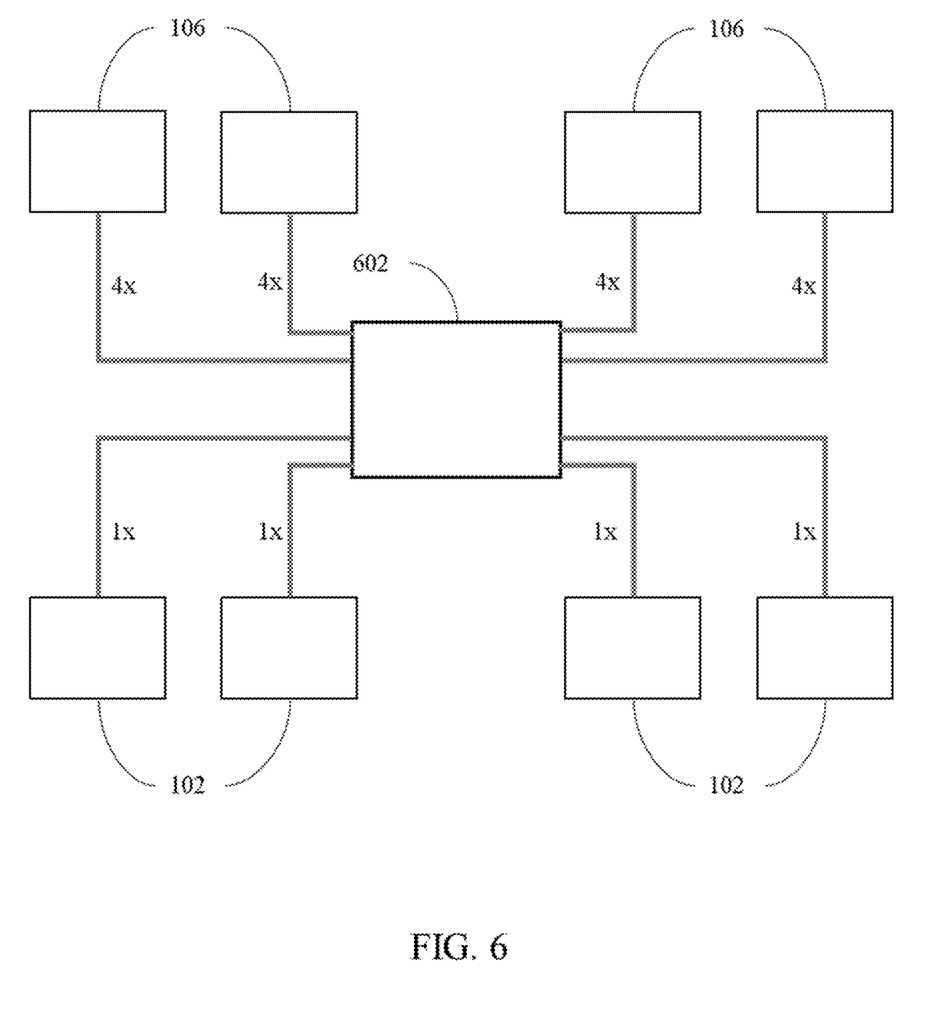
FIG. 6 is an example of a connection from four systems on a chip to four radioheads via a low power field programmable gate array in the backpackable electronic warfare system.

The backpackable electronic warfare system 100 includes accurate timing to key (i.e., either transmit, receive, or both transmit and receive) the one or more radioheads 102. A low voltage differential signal channel (LVDS), connected to one or more radioheads 102, may be used to key the one or more radioheads 102. The low voltage differential channel may also include a field programmable gate array switch 602 to control one or more radioheads 102 throughout the backpackable electronic warfare system 100. FIG. 6 shows an example where low voltage differential signal channels are used to key the one or more radioheads 102. Each amplifier 314 within each radiohead 102 is connected to the radiohead field programmable gate array 308, which is then connected to the systems on a chip 106 via low voltage differential signal channels that run through a field programmable gate array switch 602. Each radiohead 102 has a single connection whereas each system on a chip 106 has four connections to the field programmable gate array switch 602.

In some examples, the systems on a chip 106 further includes a control plane, data plane, optical channels, or a combination thereof. The 1 GbE control plane is used to connect all systems on a chip 106 to the single board computer 108 and determine how data should be managed within the backpackable electronic warfare system 100. In an example, there may be a single 1 GbE control plane connection on each systems on a chip 106. A switch is used to maintain control of each systems on a chip 106. The switch has 12 or more 1 GbE connection to connect to each systems on a chip 106, each radiohead 102, various field programmable gate arrays, the single board computer 108, and an external port.

In an example, the data plane may be a 10 GbE or 40 GbE data plane. The data plane is user configurable to suit specific backpackable electronic warfare system 100 applications. In most instances, the data plane communicates common information between the systems on a chip 106 for standard operations. In an example, each systems on a chip 106 has a 40 GbE lane that routes into a switch. The switch or single board computer 108 then manages the routing of data between systems on a chip 106, other payloads, and, in some examples, the single board computer 108. In another example, the data plane is four 10 GbE lanes that may or may not have a switch depending on the backpackable electronic warfare system 100.

In an example, the optical channels may be dual 100 GbE optical channels. The optical channels may be used to offload or transfer high volume data between each systems on a chip 106. A switch in the backplane 104 may be used to utilize both optical channels together to relay 200 GbE worth of data. Each systems on a chip 106 would connect both optical channels to the switch to relay the data between each systems on a chip 106. When a switch is not used, the optical channels may have a 100 GbE daisy-chain configuration between the systems on a chip 106. In another example, a Xilinx Aurora serial protocol may be used to divide each channel so that the data may be routed individually to each systems on a chip 106 in a mesh configuration without using a switch.

Referring back to FIG. 1, a single board computer (SBC) 108 is also included in the backpackable electronic warfare system 100. In some examples, the single board computer 108 includes a processor, RAM, a PCIe connector, a USB connection, storage, and an Ethernet connection. The single board computer 108 functions as the backpackable electronic warfare system 100 controller, manages the flow of data across all interfaces, and distributes tasking to each system on a chip 106. The single board computer 108 maintains the 1 GbE control plane (Ethernet), manages timing or clocking within the system, relays position and navigation information to the Human Machine Interface (HMI), and helps the systems on a chip 106 with processing, if required. In some examples, the single board computer 108 is also connected to a 1 GbE control plane, 10/40 GbE data plane, Dual 100 GbE optical channels, or a combination thereof. When one of the connections (e.g., 1 GbE control plane, 10/40 GbE data plane, Dual 100 GbE optical channels, or a combination thereof) is used, the single board computer 108 is connected to each systems on a chip 106 via one of the connections in order to communicate information. The operational temperature range for the single board computer 108 ranges from about −40° C. to about 80° C. In an example, the single board computer 108 includes equal to or greater than 8 GB of RAM. Some examples of the single board computer 108 include Intel NUC, LattePanda, and Kontron COMe-bSL6R.

The storage of the single board computer 108 may vary depending on the application. In some examples, the single board computer 108 may have embedded storage. In other examples, additional storage may be necessary. In an example, either the embedded storage or the additional storage has a read/write speed equal to or greater than 500 MB/s. Some examples of the storage include SATA solid state drives (SSD) or NVMe solid state drives. The storage may be connected to the single board computer 108 directly with M.2 connectors, SATA connectors, SAS connectors, or through a storage controller. The storage controller can be connected to the single board computer 108 via an Ethernet or PCIe connection. This allows the systems on a chip 106 to directly interface with the storage device without going through the single board computer 108.

In an example, when PCIe connections are used, the PCIe connection enables high-speed transfer of data between systems on a chip 106. The high-speed transfer allows processing to be split between different devices in real time and data to be moved to a storage device before the overflow of data causes the systems on a chip 106 to buffer. In some examples, the PCIe connections may be used without the control plane, 10/40 GbE data plane, or Dual 100 GbE optical channels. In other examples, the PCIe connections may be used in conjunction with control plane, 10/40 GbE data plane, or Dual 100 GbE optical channels.

Figure 7A:
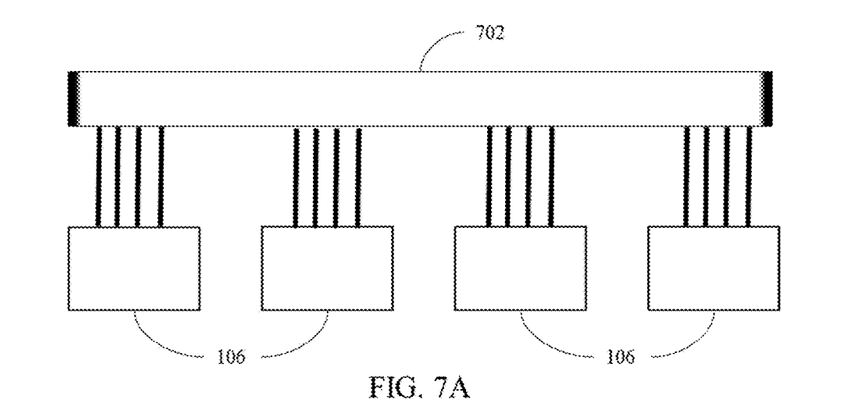
FIG. 7A-7C are different examples of PCIe connections via a PCIe switch in the backpackable electronic warfare system.
Figure 7B:
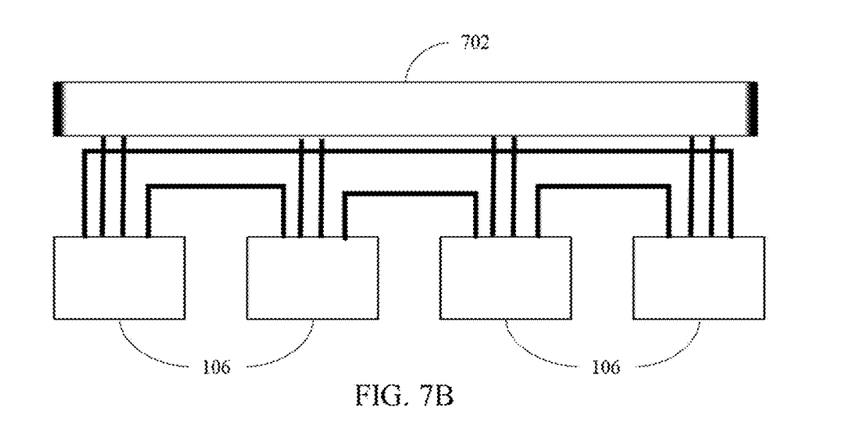
Figure 7C:
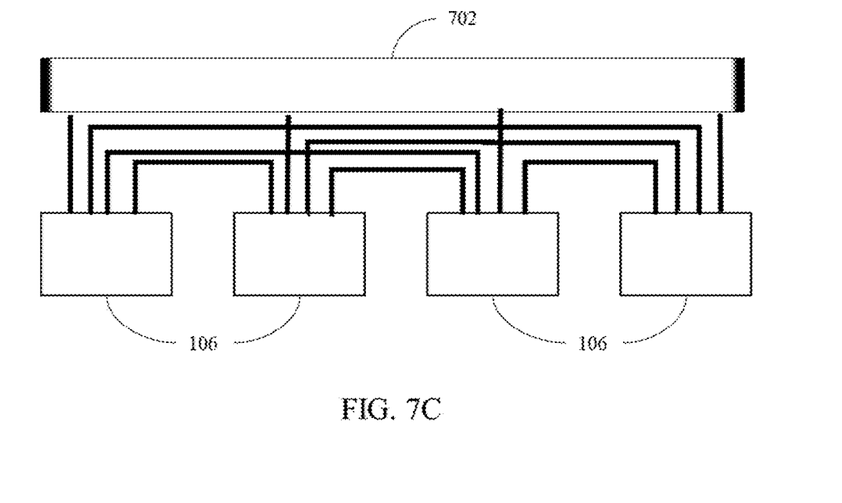

Some examples of the PCIe configuration are shown in FIG. 7A-7C. In FIG. 7A, the systems on a chip 106 are connected to a PCIe switch 702. The PCIe switch 702 allows all systems on a chip 106 to use each lane to any other PCIe devices. In addition, the PCIe switch 702 allows different PCIe generations to communicate and removes the need of modifying the baseband signal processor (BSP) to allow the lanes to be divided. In an example, when a PCIe switch 702 is used, the PCIe switch 702 supports equal to or greater than 20 lanes. In FIG. 7B, a daisy chain configuration is shown where the systems on a chip 106 are connected via daisy chained PCIe connections. This allows excess PCIe lanes to be connected to other devices (e.g., single board computer 108, storage, etc.). In FIG. 7C, a direct PCIe connection is shown between each system on a chip 106. This allows non-sequential PCIe connections.

Referring back to FIG. 1, the backpackable electronic warfare system 100 includes a position, navigation, and timing module 110. The position, navigation and timing module 110 provides accurate, synchronized time distribution and location services. The position, navigation and timing module 110 has an output clocking capable of providing a frequency signal to the subsystems (i.e., any component that requires timing, for example, the one or more systems on a chip 106, the one or more radioheads 102, or the single board computer 108) ranging from about 10 MHz to about 250 MHz. In addition, the position, navigation, and timing module 110 has a phased locked loop that generates the frequency signal equal to or greater than 10 MHz based on a GPS input signal.

Figure 8:
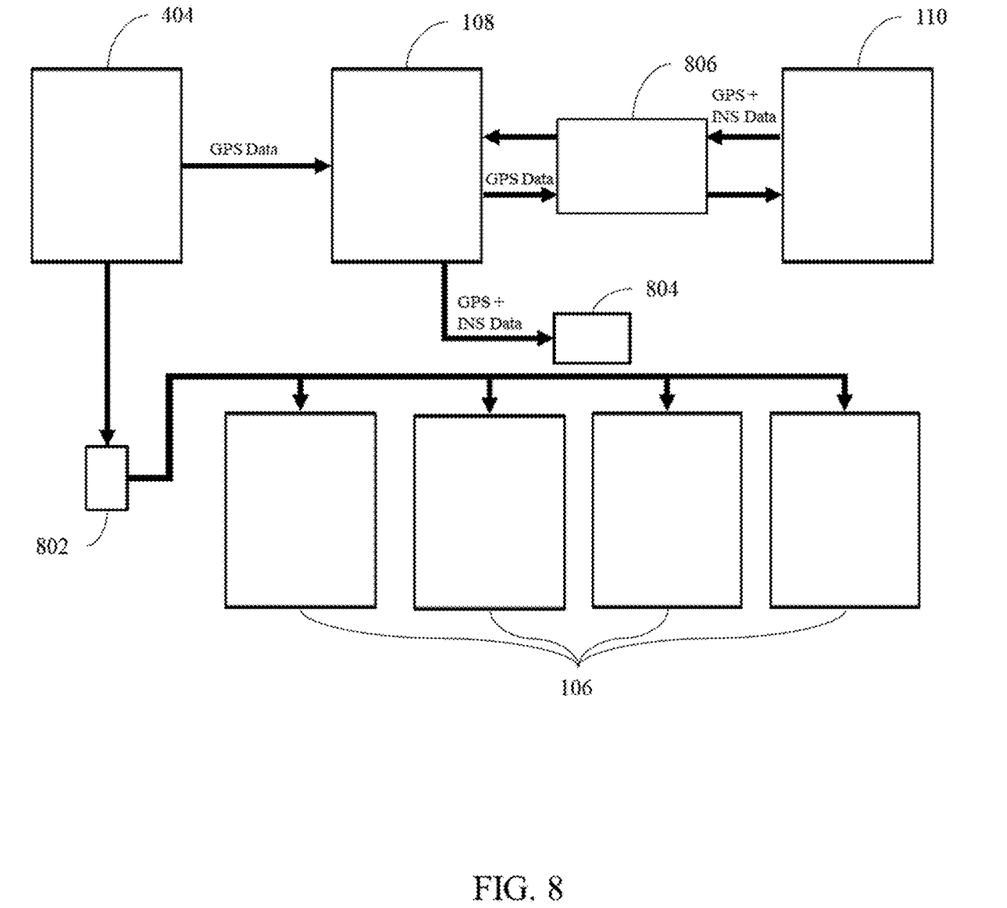
FIG. 8 is an example of a position, navigation, and timing module in the backpackable electronic warfare system.

FIG. 8 shows a block diagram of an example of how the position, navigation, and timing module 110 is connected to the backpackable electronic warfare system 100. In FIG. 8, the position, navigation, and timing module 110 accepts the NMEA statements (shown in FIG. 8 as "GPS Data") from a GPS 404 and performs inertial navigation calculations if GPS signal is lost or spoofed. In an example, the GPS may be any known GPS. In another example, the GPS may be a SAASM GPS or M code GPS. The position, navigation, and timing module 110 then communicates with the single board computer 108 (shown in FIG. 8 as "GPS+INS Data") to deliver accurate position and navigation information to the HMI 804. The Universal Asynchronous Receiver Transmitter (UART) 806 is used to convert the signal between the position, navigation, and timing module 110 and the single board computer 108 to a standard type of communication (e.g., RS232). In addition, the phase locked loop 802 increases the frequency of the signal from the GPS 404 before transmitting the signal to each systems on a chip 106. For example, the signal can be increased from 10 MHz to 25 MHz via the phase locked loop 802.

Referring back to FIG. 1, the backpackable electronic warfare system 100 also includes a power management device 116, a thermal management device (not shown in FIG. 1), and one or more batteries 118. The power management device 116 regulates power to each component in the system 100. In some examples, the power management device 116 senses which systems on a chip 106 are connected and supplies power only to the systems on a chip 106 that are connected and in use. In addition, the power management device 116 can supply variable power to the single board computer 108 depending on whether processors are overclocking or underclocking. In an example, the power management device may be the single board computer (SBC) 108 in conjunction with a power controller. In some instances, the systems on a chip 106 may not be required during some functions of the backpackable electronic warfare system 100. In these instances, the systems on a chip 106 may be powered down or put into a low power state. This low power state may be reached by reducing the clock cycle, limiting processing, or internally powering down circuitry. The low power state reduces power consumption, but may keep the equipment in a condition where increasing to full functionality takes little or less time than powering the equipment from an off state.

Figure 9A:
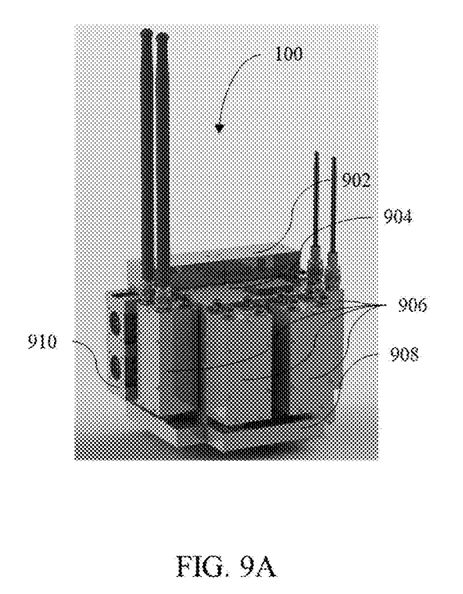
FIG. 9A-9C are different views of an example of a backpackable electronic warfare system.
Figure 9B:
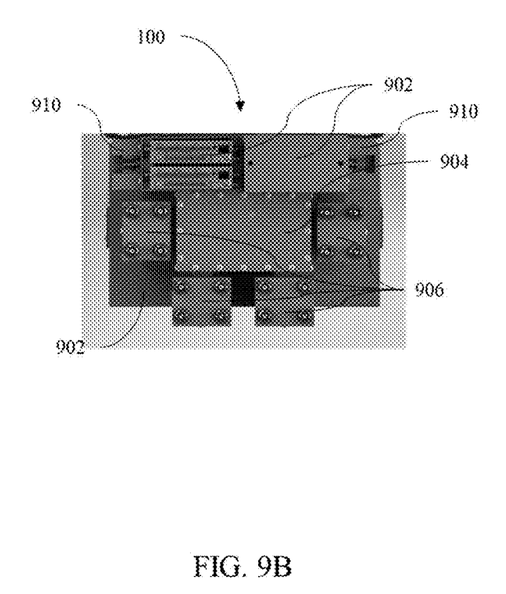
Figure 9C:
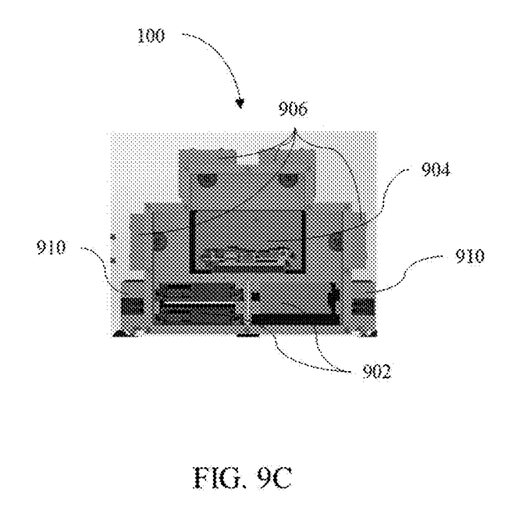

Regarding the thermal management device, the thermal management device dissipates thermal loads from the other components of the electronic backpackable system 100. The thermal management device is not depicted in FIG. 1, however, some examples of where the compartments may be located are shown in FIG. 9A-9C discussed below. In an example, the thermal management dissipates equal to or greater than 160 W of heat. Thermal management devices may be located between systems on a chip 106 enclosures, on the single board computer 108, on the one or more radioheads 102, on the backplane 104 of the backpackable electronic warfare system 100, or a combination thereof. Some examples of the thermal management device includes vapor chambers, heat sinks, active cooling via fans, conduction rails, and a combination thereof.

The one or more batteries 118 provide power to the system 100. The one or more batteries 118 may be rechargeable, replaceable, or a combination thereof. In addition, the one or more batteries may support renewable energy sources, recharging by a vehicle platform (e.g., car or ship), or building platform. In an example, the one or more batteries may be any batteries that provide an electrical power equal to or greater than 300 W. In a specific example, the one more batteries are BB-2590 batteries.

Referring now to FIG. 9A-9C, different views of an example of a backpackable electronic warfare system 100 are shown. FIG. 9A is an isometric view of the backpackable electronic warfare system 100. FIG. 9B is a top view of the backpackable electronic warfare system 100. FIG. 9C is a bottom view of the backpackable electronic warfare system 100. In FIG. 9A-9C, the backpackable electronic warfare system 100 includes a systems on a chip compartment 902, a single board computer and position, time, and navigation module compartment 904, a radiohead compartment 906, a backplane compartment 908, and a thermal management compartment 910. In FIG. 9C, there is no backplane compartment 908 shown in order to see the other compartments of the backpackable electronic warfare system 100. The systems on a chip compartment 902, the single board computer and position, time, and navigation module compartment 904, the radiohead compartment 906, a backplane compartment 908, and the thermal management compartment 910 include the systems on a chip 106, the single board computer 108, position, time, and navigation module 110, the one or more radioheads 102, the backplane 104, and the thermal management system, respectively. The systems on a chip 106, the single board computer 108, the one or more radioheads 102, the backplane 104, and the thermal management system are the same systems on a chip 106, the single board computer 108, the one or more radioheads 102, the backplane 104, and the thermal management system as previously described herein.

Figure 10A:
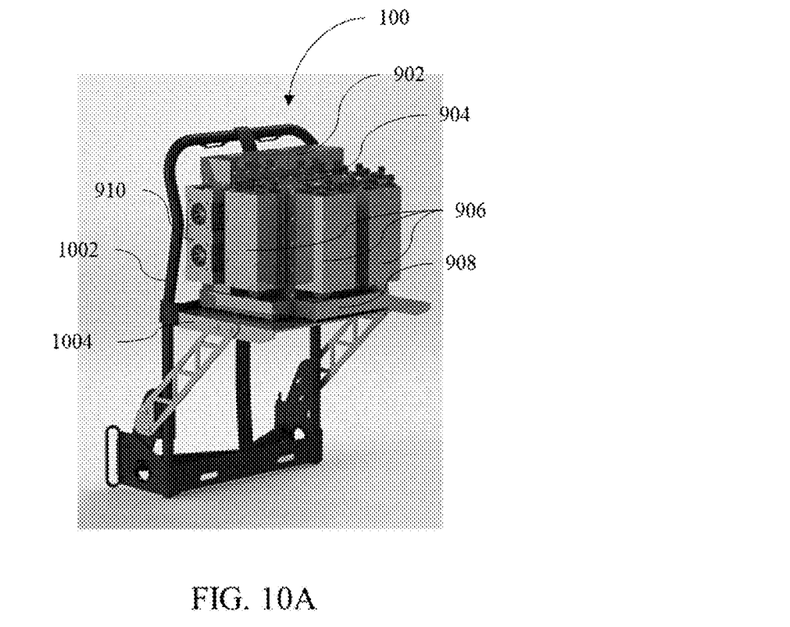
FIG. 10A-10B are examples of a backpackable electronic warfare system including a frame that allows the system to be portable.
Figure 10B:
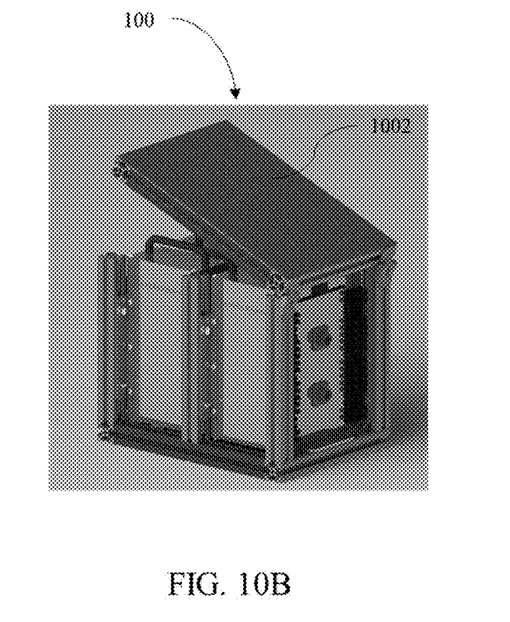

Referring now to FIG. 10A-10B, in some examples, the backpackable electronic warfare system may further include a frame 902. The frame 902 attaches to the backpackable electronic warfare system 100 to a backpack that can be carried or transported by an individual. Some examples of the frame 1002 include an ALICE frame, a FILBE pack frame, an Eberlestock F1 Mainframe, a Mystery Range Terraframe, or a KUIU Carbon Fiber Frame. FIG. 10A is an example of the backpackable electronic warfare system 100 on an ALICE frame 1002. The ALICE frame 1002 also has a rack mount shelf 1004, which holds the backpackable electronic warfare system 100, and, in some examples, is where a battery may be located. FIG. 10B is another example of the backpackable electronic warfare system 100 on an a FILBE frame 1002.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about −40° C. to about 80° C. should be interpreted to include not only the explicitly recited limits of from about −40° C. to about 80° C., but also to include individual values, such as −20° C., 0° C., 45° C., etc., and sub-ranges, such as from about 5° C. to about 15° C., etc.

In describing and claiming the examples disclosed herein, the singular forms "a", "an", and "the" include plural referents unless the context clearly dictates otherwise.

What is claimed is:

1. A backpackable electronic warfare system, comprising:
   one or more radioheads, wherein the one or more radioheads are connected to a switching matrix via signal lines and have a RF front-end architecture with a radiohead field programmable gate array to identify radiohead capabilities of the one or more radioheads being used;
   one or more systems on a chip, wherein the one or more systems on a chip are connected to the switching matrix via the signal lines and have a 3U OpenVPX form factor following the Sensor Open Systems Architecture standards;
   a single board computer, wherein the single board computer includes a processor, RAM, a PCIe connector, a USB connection, storage, and an Ethernet connection;
   a position, navigation, and timing module, wherein the position, navigation, timing module has an output clocking capable of providing a frequency signal to the one or more systems on a chip ranging from about 10 MHz to about 250 MHz;
   power management device, wherein the power management device regulates power to each component and is capable of powering off unused components thereby saving energy;
   thermal management device, wherein the thermal management dissipates equal to or greater than 160 W of heat;
   one or more batteries, wherein the one or more batteries provide an electrical power equal to or greater than 300 W; and
   a backplane, wherein the backplane connects the one or more radioheads, the one or more systems on a chip, the one or more batteries, and the thermal management device to the single board computer, the position, navigation, and timing module, and the power management device.

2. The system of claim 1, further including a frame, wherein the backpackable electronic warfare system is capable of being transported with the frame.

3. The system of claim 2, wherein the frame is an ALICE frame, a FILBE pack frame, an Eberlestock F1 Mainframe, a Mystery Range Terraframe, or a KUIU Carbon Fiber Frame.

4. The system of claim 1, wherein the one or more radioheads include one or more bandpass filters, a low noise amplifier, a down converter, an up converter, a power amplifier, an attenuator, and combinations thereof.

5. The system of claim 1, wherein the one or more radioheads further include a connector where the connector is a MIL-DTL-38999 connector, an ITT-Cannon MS27472 Series II connector, Meritec Hercules MIL-SPEC Connector, Smiths Interconnect L Series High Density Modular Connector, or a combination thereof.

6. The system of claim 1, further including low voltage differential signal channels where the low voltage differential signal channels key a RF front-end signal from the RF front-end architecture through the radiohead field programmable gate array.

7. The system of claim 1, further including one or more intermediate backplanes, wherein the one or more intermediate backplanes connect the one or more systems on a chip to the backplane via an intermediate backplane connector.

8. The system of claim 7, wherein the intermediate backplane connector has a mating cycle equal to or greater than 1000 cycles.

9. The system of claim 7, wherein the intermediate backplane connector is modular and reconfigurable to function with the one or more systems on a chip.

10. The system of claim 1, wherein the system on a chip is a RF systems on a chip with a RF system on a chip field programmable gate array that includes an analog-to-digital converter and a digital-to-analog converter to generate and record RF data.

11. The system of claim 1, wherein the single board computer has equal to or greater than 8 GB of RAM.

12. The system of claim 1, wherein the storage includes a read/write speed equal to or greater than 500 MB/s.

13. The system of claim 1, wherein the systems on a chip includes a control plane, data plane, optical channels, or a combination thereof.

14. The system of claim 1, wherein the PCIe connector connects to a PCIe switch, has a daisy chain connection to all systems on a chip, or all systems on a chip are connected to each other directly.

15. The system of claim 1, wherein the PCIe connector includes a PCIe switch that supports equal to or greater than 20 lanes.

16. The system of claim 1, wherein the single board computer has an operational temperature range ranging from about $-40°$ C. to about $80°$ C.

17. The system of claim 1, wherein the thermal management device is selected from the group consisting of vapor chambers, heat sinks, active cooling via fans, conduction rails, and a combination thereof.

18. The system of claim 1, wherein the power management device is a low power field programmable gate array that has voltage lines connected to the systems on a chip.

19. The system of claim 1, wherein the system on a chip is a RF systems on a chip, the switching matrix is an RF switching matrix, and the signal lines are RF lines or a multiprocessor systems on a chip, the switching matrix is a fiber optic switch, and the signal lines are fiber optic lines.

20. The system of claim 19, wherein the RF switching matrix further includes RF switches selected from the group consisting of electromechanical switches, a solid-state switches, micro electromechanical switches, or a combination thereof.

* * * * *